(12) United States Patent
Lloyd

(10) Patent No.: US 8,612,494 B2
(45) Date of Patent: Dec. 17, 2013

(54) SELECTIVE FILE PROVISIONING DEPENDING ON MODE OF OPERATION OF AN ELECTRONIC DEVICE CAPABLE OF ASSUMING A PLURALITY OF OPERATING MODES

(75) Inventor: Kevin Russell Coates Lloyd, Poway, CA (US)

(73) Assignee: Sierra Wireless, Inc., Richmond, British Columbia (CA)

( * ) Notice: Subject to any disclaimer, the term of this patent is extended or adjusted under 35 U.S.C. 154(b) by 109 days.

(21) Appl. No.: 12/834,497

(22) Filed: Jul. 12, 2010

(65) Prior Publication Data

US 2012/0011175 A1    Jan. 12, 2012

(51) Int. Cl.
*G06F 17/30*    (2006.01)

(52) U.S. Cl.
USPC .......................................................... 707/822

(58) Field of Classification Search
USPC ................................................ 707/823, 822
See application file for complete search history.

(56) References Cited

U.S. PATENT DOCUMENTS

| | | | |
|---|---|---|---|
| 5,825,726 A | 10/1998 | Hwang et al. | |
| 5,875,476 A | 2/1999 | Nijboer | |
| 6,606,669 B1 * | 8/2003 | Nakagiri | 719/327 |
| 6,762,984 B1 * | 7/2004 | Sasaki et al. | 369/53.24 |
| 2003/0021200 A1 * | 1/2003 | Higashi | 369/47.39 |
| 2003/0043396 A1 * | 3/2003 | Klosterman et al. | 358/1.13 |

OTHER PUBLICATIONS

"How do I access different sessions on a multi-session CD?," CD-Recordable FAQ, A. McFadden et al., Jan. 12, 2004, http://stason.org/TULARC/pc/cd-recordable/3-11-How-do-I-a.
"CD Roller® User's Manual," Digital Atlantic Corp. 2003-2010, http://www.cdroller.com/download/Manual.pdf.
"TruInstall," White Paper, Sierra Wireless, Inc. Document No. 2130914, Rev. 1.0, Aug. 2007.
Kuan Jen Lin & JR Tsung Lin, Automated Development Tools for LINUX USB Drivers, 2010 14th International Symposium on Consumer Electronics.

* cited by examiner

*Primary Examiner* — Rehana Perveen
*Assistant Examiner* — Alexander Khong
(74) *Attorney, Agent, or Firm* — Gottlieb, Rackman & Reisman, P.C.

(57)    ABSTRACT

The present invention provides a system, method and computer-program product for selectively providing operating information for operation of an electronic device, which is capable of assuming a plurality of operating modes. The system comprises a store and a file access module. The store includes a plurality of files and a plurality of file identification data sets. Each of the file identification data sets is associated with one or more of the plurality of files, which include the operating information. The file access module is configured for operatively interacting with the store and to select one of the file identification data sets based on an actual operating mode of the electronic device. Each file identification data set is associated with one or more of the operating modes. The file access module is configured to provide the one or more files associated with the file identification data set selected.

27 Claims, 3 Drawing Sheets

SELECTIVE FILE PROVISIONING DEPENDING ON MODE OF OPERATION OF AN ELECTRONIC DEVICE CAPABLE OF ASSUMING A PLURALITY OF OPERATING MODES

FIELD OF THE INVENTION

The present invention pertains in general to aspects of storing and providing files and in particular to selectively providing files included in an electronic device.

BACKGROUND

Many electronic devices require driver software for operation in combination with a host computer system. Driver software is usually used to provide information enabling the host computer system to configure, control and/or operate the electronic device and may be copied to and even retained in the host computer system in consequence of the electronic device being connected to the host computer system. Driver software has traditionally been distributed to users via accompanying memory devices such as floppy disks, CDs or DVDs shipped along with the electronic device, or via the Internet, for example. To facilitate the first time operation of an electronic device without the need for accompanying memory devices and without the need for an Internet connection, an increasing number of devices are preconfigured to provide at least some information needed for their operation in combination with predetermined types of host computer systems in a memory included in the electronic device itself so that no accompanying memory devices or Internet connection is required to at least in part operate the electronic device in combination with the host computer system.

Various types of interconnect systems for operatively connecting an electronic device with a host computer system, such as Universal Serial Bus (USB), CardBus, ExpressCard or otherwise, exist that can be used to switch the electronic device between a mass storage memory and other function, such as a wireless modem function, for example, without the need to physically disconnect the electronic device from the host computer system or require reconfiguration of the electronic device by a user. For example, the USB protocol has been used in combination with the Small Computer System Interface (SCSI) protocol to access a file system image stored within the electronic device. The SCSI protocol is used to read blocks of the file system images and a suitable file system driver is used to interpret the contents of the blocks. A read-only CDROM file system image including corresponding files has been commonly used for this purpose.

This prior solution is further known to be used to offer different combinations of files depending on the mode an electronic device is operating in, however, known implementations are based on employing a separate file system image per combination of files, which promotes duplication of data.

Therefore there is a need for a solution that overcomes at least one of the deficiencies in the art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide selective file provisioning depending on mode of operation of an electronic device capable of assuming a plurality of operating modes. According to an aspect of the present invention there is provided a system for selectively providing operating information for operation of an electronic device in a plurality of operating modes, the system comprising a store including a plurality of files and a plurality of file identification data sets, each of the file identification data sets associated with one or more of the plurality of files, the plurality of files including the operating information; and a file access module for operatively interacting with the store, the file access module configured to select one of the file identification data sets based on an actual operating mode of the electronic device, wherein each file identification data set is associated with one or more of the operating modes, and the file access module is configured to provide the one or more files associated with the file identification data set selected.

According to another aspect of the present invention there is provided a method for selectively providing operating information for operation of an electronic device in a plurality of operating modes, the method comprising providing a plurality of files and a plurality of file identification data sets in a store, each of the file identification data sets associated with one or more of the files; operatively interacting with the store to select one of the file identification data sets based on an actual operating mode of the electronic device; providing the one or more files associated with the file identification data set selected; whereby the files provide the operating information and each file identification data set is associated with one or more of the operating modes.

According to another aspect of the present invention there is provided a computer-program product configured to selectively provide operating information for operation of an electronic device, the computer program product comprising code, which when loaded into memory and executed on an associated processor, is adapted to perform: providing a plurality of files and a plurality of file identification data sets in a store, each of the file identification data sets associated with one or more of the files; operatively interacting with the store to select one of the file identification data sets based on an actual operating mode of the electronic device; providing the one or more files associated with the one of the file identification data sets; whereby the files provide the operating information and each file identification data set is associated with one of the operating modes.

DETAILED DESCRIPTION OF THE INVENTION

Definitions

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The present invention provides a system for selectively providing operating information for operation of an electronic device in a plurality of operating modes wherein the operating information is included in a plurality of sessions provided by a multi-session file system image. The electronic device may be configured for external and/or internal interconnection with a host computer system. For example, the electronic device may be configured as a peripheral electronic device. Moreover, the electronic device may be configured with a USB, PC Card, Express Card, PCMCIA, Firewire, AGP, PCI, PCI II or other interconnect system, for example.

The electronic device is configured to support two or more operating modes, for example, a mass memory storage mode or another mode of operation. Other modes of operation of the electronic device may depend on the purpose for which the electronic device is designed and may be associated with a corresponding function of the electronic device. For example, the electronic device may be configured to provide a wireless modem, network interface card or other communication device, a memory device reader, a haptic or visual input and or output user interface device or other device which can be interconnected to a host computer system. In some embodiments, different operating modes may be associated with different host operating systems and/or operating systems of the electronic device. For example, one or more operating modes may be associated with one or more predetermined versions of Microsoft operating systems (OSs), one or more predetermined versions of Apple MAC OSs, or one or more predetermined other OSs.

Operating information provided by a system according to embodiments of the present invention, may include software, firmware, predetermined data and/or other information which may be used by a combination of an operatively interconnected host computer system and the electronic device, in order to control, configure, operate and/or otherwise affect the electronic device during operation.

Figure 1:
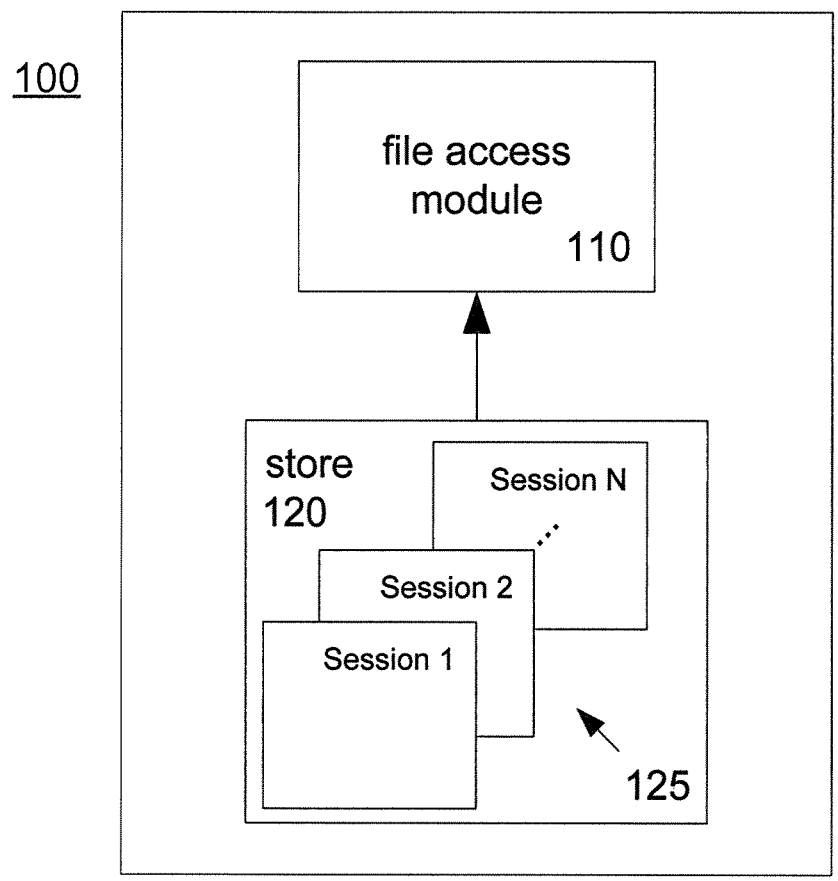
FIG. 1 illustrates a block diagram of a system according to embodiments of the present invention.

FIG. 1 illustrates a block diagram of a system 100 according to embodiments of the present invention. The system 100 comprises a store 120 and a file access module 110. The store 120 and the file access module 120 are operatively interconnected and configured to provide read only or read-write access to the store.

The store includes a plurality of sessions 125 providing a plurality of files (not illustrated) and a plurality of file identification data sets. Each of the file identification data sets is associated with one of the sessions 125 and is configured to indicate one or more associated files. The files are configured to include at least some operating information required to operate the electronic device. Each file identification data set is associated with one or more of the operating modes of the electronic device.

The file access module is configured to operatively interact with the store. The file access module is further configured to select one of the file identification data sets based on an actual operating mode of the electronic device. The file access module is configured to provide the files that are associated with the file identification data sets associated with the operating mode of the electronic device.

Depending on the embodiment, a system according to embodiments of the present invention, at least in part, can be employed, included and/or otherwise provided in an electronic device, a host computer system or a combination thereof. A system according to embodiments of the present invention may be configured to provide the operating information by selectively providing one or more files included in the store via one or more interconnect systems, for example, a USB, PC Card, Express Card, PCMCIA, Firewire, AGP, PCI, PCI II or other interconnect system.

Store

According to embodiments of the present invention, the store is configured as an integral part of the electronic device. The store may be provided by a mass storage memory module included in the electronic device comprising non-volatile or volatile memory, for example. The memory module may include ROM, PROM, EPROM, EEPROM, magnetic RAM, FLASH, or other non-volatile memory. The memory module may also comprise random access memory (RAM), static RAM, dynamic RAM, or other volatile memory in combination with a backup power module including a battery, for example. The memory may be capable of read-only or read-write operations with respect to the electronic device and/or a host computer system.

According to some embodiments of the present invention, the store comprises a multi-session file system image, for example, a multi-session CD or DVD file system image. The multi-session file system image is configured to include a predetermined number of sessions. The number of sessions is determined based on the number of operating modes of the electronic device. The operating information for each operating mode may be encoded in one or more files. Depending on the embodiment, the multi-session file system image may be configured to include one session per operating mode, two or more operating modes may share one session, the total number of sessions may be larger than the total number of operating modes or otherwise, for example. The multi-session file system image may be configured in accordance with ISO/IEC 13490, ISO/IEC 13346 or other multi-session file system image criteria and/or standard, for example.

Depending on the embodiment, the collective of all files required for all operating modes of the electronic device may be stored within a single predetermined session, for example in the first session, or stored in a distributed fashion across multiple sessions. Further to the files used to encode the operating information, each session includes one or more file identification data sets. Each file identification data set indicates the files associated with a corresponding operating mode of the electronic device. The file identification data sets may be used by the file access module to determine the files associated with and to be provided in a particular operating mode.

According to some embodiments of the present invention, the multi-session file system image may further include operating mode association data (OMAD). The OMAD can be used to encode a predetermined correlation between operating modes and the sessions in the multi-session file system image. Depending on the embodiment, the OMAD may be used by the file access module to identify which session to read files from when the electronic device operates in a specific operating mode.

The OMAD may be configured in different ways, depending on the embodiment. For example, the OMAD may be encoded in a predetermined manner and included in the multi-session file system image. For example, the OMAD may be encoded in an OMAD table or otherwise configured. According to an embodiment, the OMAD is included in a predetermined session of the multi-session file system image. According to another embodiment, the multi-session file system image is configured to include predetermined pieces of the OMAD in predetermined file identification data sets. For example, each of the file identification data sets of one or more sessions include a portion of the OMAD that identifies one or more operating modes that are associated with the particular sessions.

According to embodiments of the present invention, the multi-session file system image may be configured so that only one copy of each file that provides operating information for the operation of the electronic device is included in it, that is, each such file is stored only once in the multi-session file system image, even if it may be required in more than one session. According to an embodiment, if such a file is required in more than one session, the file is stored in only one, predetermined session, and the file identification data sets associated with the sessions in which the file is required are configured to indicate where the file is located. For example, the session that the file is stored in is indicated in the corresponding file identification data sets. Accordingly less memory may be required for storing operating information than in other storage schemes.

In accordance with embodiments of the present invention, a multisession file system image may be configured in different ways. A multisession files system image may be configured in accordance with a multisession CD, CDROM, CD-R, DVD, DVD-R format such as ISO/IEC 13490, ISO/IEC 13346 or another multisession file system format, for example.

According to an embodiment, a multi-session file system image may be configured to provide a predetermined number of sessions, yet, serve a different number of operating modes. For example, multiple operating modes may be served by only one session, provided the operating information required by these modes can be encoded in the same set of files. This may be facilitated by adequately configured operating mode association data and a correspondingly configured multi-session file system image.

In accordance with some embodiments of the present invention a master session storage scheme may be employed, wherein a multi-session file system image is configured to include a predetermined master session that includes a collective of the files of all operating modes. Depending on the embodiment, the master session may be associated with one of the operating modes of the electronic device. The master session may be the first session, for example.

In accordance with some embodiments, the master session is further configured to include a file identification data set identifying all files of the master session but wherein the master session, by itself, is not associated with one of the operating modes of the electronic device. In this case, only sessions of the multi-session file system image other than the master session are associated with operating modes of the electronic device. Such a storage scheme may be used in case no operating mode provides the collective of all files of all operating modes and all files of the master session are to be identified in the file identification data set of the master session.

According to some embodiments of the present invention, the multi-session file system is configured to include one or more update sessions, each including one or more updated files and updated file identification data sets. For example, an update session can be used to provide updated files as replacements to predetermined files that are associated with predetermined other sessions, wherein these predetermined other session can be determined in accordance with the updated file identification data sets. Consequently, an update session may partially or completely replace another session. For example, an update session may include an updated version of a file which is also included in another session, wherein that other session only includes that one file. Updated files can be used to replace other files already included in other sessions. Update sessions may be used in combination with stores in which previously recorded operating information cannot be overwritten, for example. In accordance with embodiments of the present invention, an update session may further include updated OMAD and an updated OMAD may be used to update associations between sessions and operating modes.

File Access Module

According to some embodiments of the present invention, the file access module may be provided by the electronic device. The file access module may be configured in software and/or firmware. According to some embodiments of the present invention, the file access module is implemented only in firmware and embodied within the electronic device.

The file access module or parts thereof may be configured for transfer to a host computer system for operation. According to some embodiments, the file access module may at least in part be operated by the electronic device. The file access module may be provided in memory included in the electronic device comprising non-volatile or volatile memory, for example. The memory may be part of the mass storage memory module associated with the store or it may be a different memory.

According to some embodiments of the present invention, the file access module comprises a file system driver. The file system driver may be implemented in software and operated by the host computer system, the electronic device or both. The file access module may be configured in a combination of hardware, software and/or firmware, which may be provided by the electronic device and/or the host computer system.

According to an embodiment of the present invention, the file access module may be configured to operate in compliance with one or more combinations of interconnect systems including one or more block data transfer systems, one or more multi-session file image systems and/or one or more interconnect systems. Block data transfer systems may include SCSI, parallel AT attachment (ATA), serial ATA or other block data transfer system; multi-session file image systems may include ISO/IEC 13490 or ISO/IEC 13346 or other multi-session files system protocols; and interconnect systems may include USB, PC Card, Express Card, PCI or other interconnect system, for example.

The file access module is configured to provide access to the files stored in the multi-session file system image included in the store in a selective fashion depending on the operating mode of the electronic device. For this purpose, the file access module is operatively coupled with the electronic device and/or the host computer system so that it can determine an actual operating mode of the electronic device. Depending on the embodiment, the file access module is configured to request information indicative of the operating mode of the electronic device from the electronic device and/or host computer system, or it is configured to receive such information in the form of an input parameter or other indication upon invocation.

According to some embodiments of the present invention, a file access module may be configured to operate in accordance with multi-session file systems that also include one or more update sessions as described herein. A corresponding file access module is configured to provide operating information for operation of the electronic device in accordance with for example, updated files, file identification data sets and/or OMAD included in the one or more update sessions. The file access module may be configured to identify update sessions based on a number of aspects including for example, a comparison of the total number of operating modes versus the total number of sessions included in the multi-session file system, the file identification data sets and the OMAD.

According to an embodiment of the present invention, the file access module is preconfigured to assume a default operating mode of the electronic device in cases an actual operating mode of the electronic device still needs to be determined. For example, the file access module may be configured to assume a default operating mode following power on during initial operation of the electronic device.

The invention will now be described with reference to specific examples. It will be understood that the following examples are intended to describe embodiments of the invention and are not intended to limit the invention in any way.

EXAMPLES

Example 1

Figure 2:
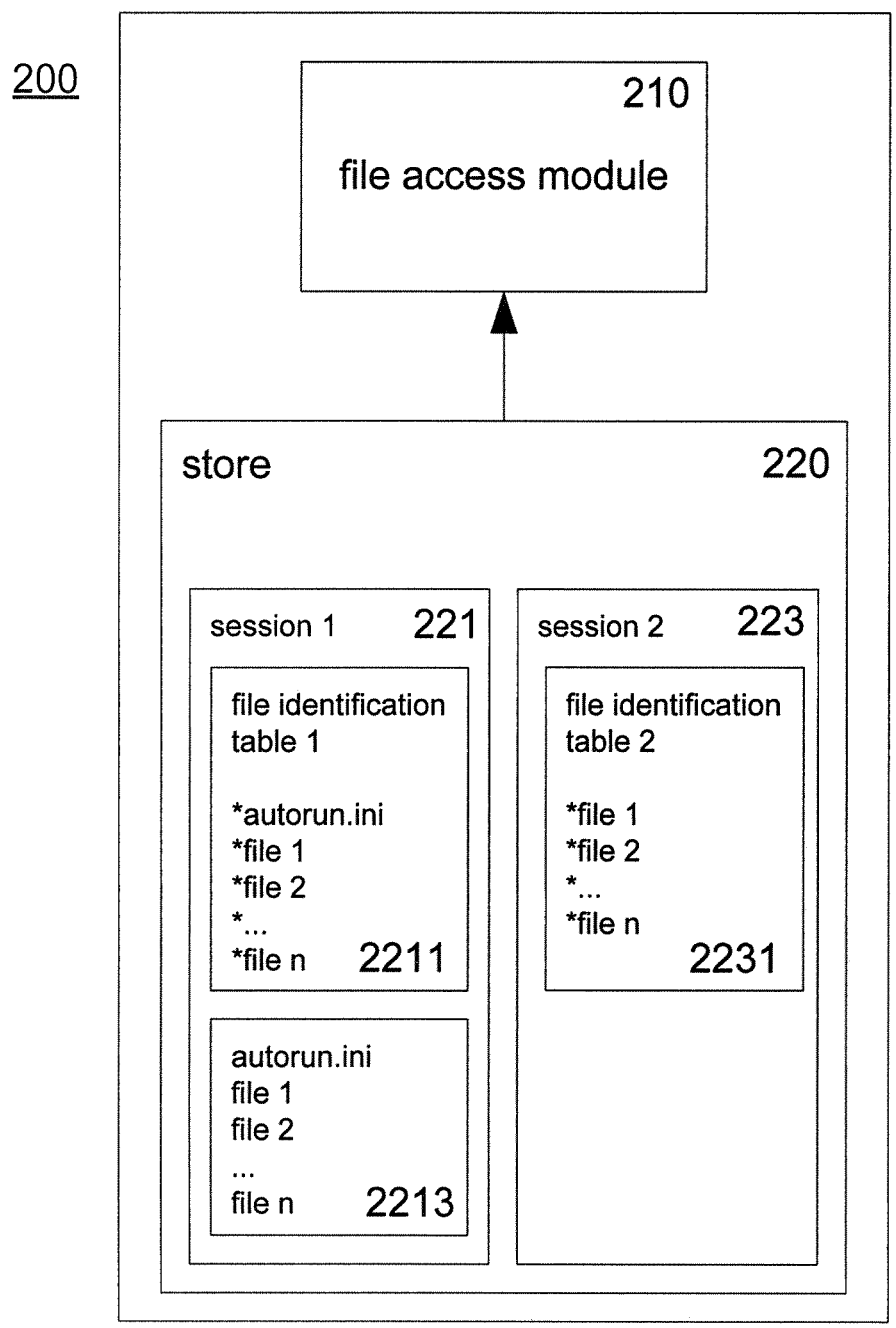
FIG. 2 illustrates a block diagram of an example system according to an embodiment of the present invention.

FIG. 2 illustrates a block diagram of an example system 200 according to an embodiment of the present invention for use in a USB wireless modem. The example system includes a store 220 comprising a two-session CDROM file system image. The first session 221 includes n files 2213 that include operating information required for operation of the wireless USB modem in two different operating modes. The first session 221 further includes a first file identification data set 2211 and an OMAD table (not illustrated) including information indicating which session is intended to be used in which operating mode of the USB wireless modem. The second session 223 includes a second file identification data set 2231 only.

The example system 200 further includes a file access module 210 configured to expose only one of the two sessions of the two-session file system image at a time depending on the actual mode of operation of the electronic device. Corresponding files are provided in response to read requests from a host computer system operatively attached to the modem. The file access module of the example system is configured for intercommunication in accordance with a SCSI protocol that is carried via USB. It is noted that other example systems may be configured differently.

The file access module is configured to respond to SCSI detect and/or read requests by exposing only the session associated with the actual operating mode of the USB wireless modem. The file access module may be further configured to block read requests for portions of the two-session image that are outside of the first session. The example system is configured to respond to SCSI READ TOC, PMA, ATIP and/or other SCSI commands with corresponding information about the first and/or second session of the file system.

The file access module is further configured to provide only the files included in the first session that are indicated in the file identification data set included in the second session when the USB wireless modem is in the second operating mode. The file access module may be configured to expose both sessions to SCSI read requests from the host computer system when the electronic device is in the second operating mode.

The example system is configured so that the first session 221 may be associated with a software installation mode and the second session 223 may be associated with a modem mode of the USB wireless modem. The first session 221 and the second session 223 are configured to provide the same set of files in both operating modes except that the autorun.ini file is not provided in the second operating mode of the modem since it is omitted from the second session 223 by merely excluding a corresponding entry in the second file identification data set 2231.

Example 2

Figure 3:
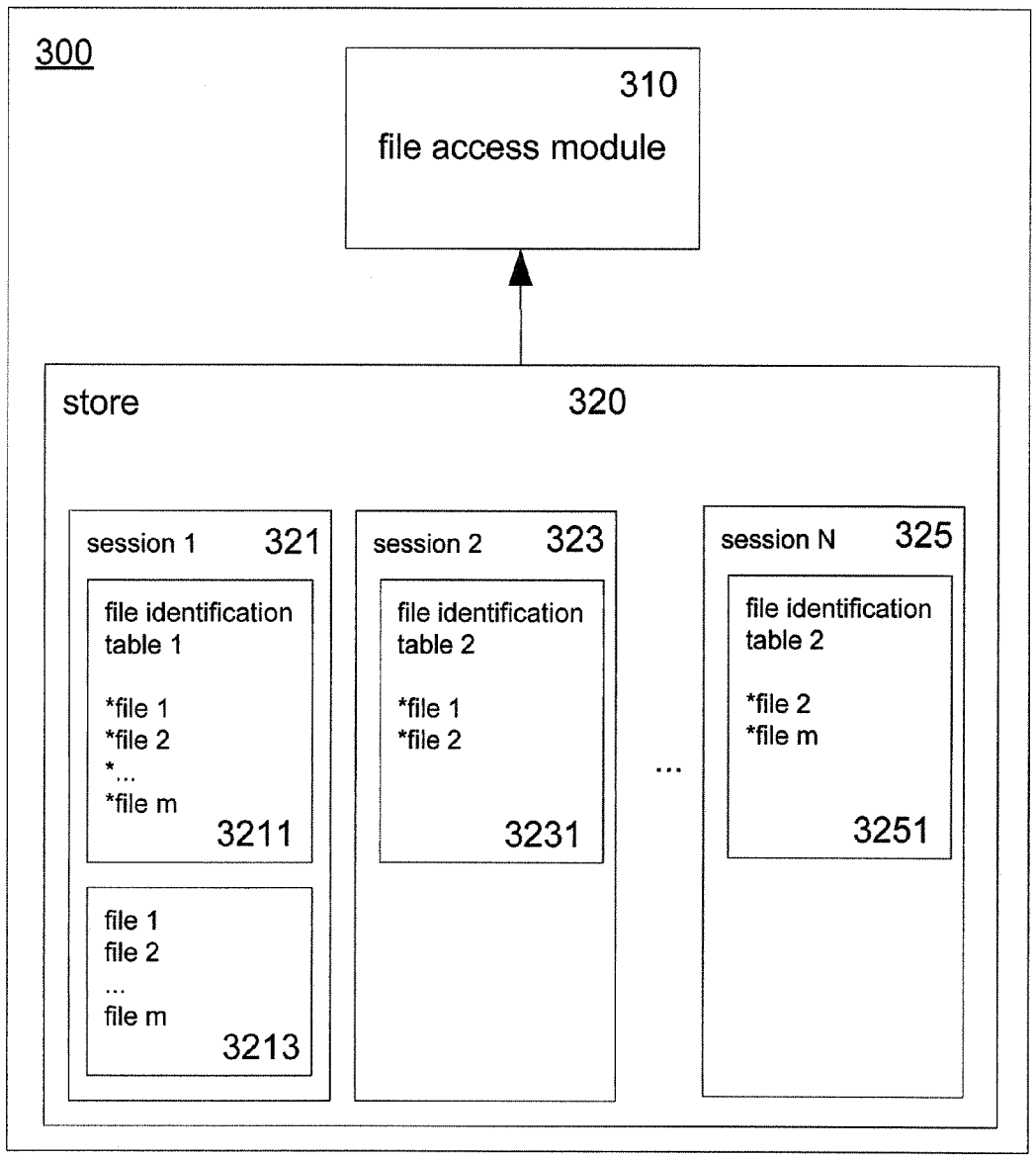
FIG. 3 illustrates a block diagram of an example system according to another embodiment of the present invention.

FIG. 3 illustrates a block diagram of an example system 300 according to an embodiment of the present invention for use in an electronic device that can be operated in N−1 operating modes. The example system includes a store 320 comprising a multi-session file system image with N sessions 321, 323 to 325. The first session 321 of the multi-session file system image is configured as a master session that is not by itself directly associated with an operating mode of the electronic device. The first session 321 includes m files 3213 including operating information required for operation of the electronic device in N−1 operating modes. The first session 321 further includes a first file identification data set 3211 and an OMAD table (not illustrated) including information indicating which one of the second to N-th sessions is to be used in which operating mode of the electronic device. Each of the second to N-th sessions 323 to 325 includes one of the respective file identification data sets 3231 to 3251.

The example system 300 further includes a file access module 310 configured to expose only one of the second to N-th sessions in combination with the respective identified files stored in the first (master) session at a time depending on the actual mode of operation of the electronic device. Files corresponding to the actual operating mode, or, if the actual operating mode is not known, a default operating mode, are provided in response to read requests from a host computer system operatively attached to the electronic device. The files to be exposed are identified in the file identification data set associated with the actual mode of operation of the electronic device.

The file access module of the example system is configured for intercommunication in accordance with a predetermined block data transfer protocol that may be carried via a predetermined interconnect system protocol.

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure some or all of its components in accordance with the system of the invention.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

The invention claimed is:

1. A system for selectively providing operating information for operation of an electronic device in a plurality of operating modes, the system comprising:
   a. a store including a plurality of files and a plurality of file identification data sets, each of the file identification data sets associated with one or more of the plurality of files, the plurality of files including the operating information, wherein the store is configured as an integral part of the electronic device in accordance with a multi-session file system image, wherein the multi-session file system image is configured to include a predetermined number of sessions, said number of sessions determined based on the number of the plurality of operating modes of the electronic device; and
   b. a file access module for operatively interacting with the store, the file access module configured to select one of the file identification data sets based on an actual operating mode of the electronic device, wherein each file identification data set is associated with one or more of the operating modes, and the file access module is configured to provide the one or more files associated with the file identification data set selected;
wherein each of the file identification data sets indicates the files associated with a corresponding one of the plurality of operating modes, and wherein at least one of the plurality of files is associated with two or more of the plurality of file identification sets and wherein said at least one of the plurality of files is stored only once.

2. The system according to claim 1, wherein each of the plurality of files is only once included in the plurality of files.

3. The system according to claim 1, wherein the store includes operating mode association data (OMAD) regarding which file identification data set is associated with which operating mode, and the file access module is configured to select the one of the file identification data sets based on the actual operating mode and the OMAD.

4. The system according to claim 3, wherein the file identification data sets include the OMAD.

5. The system according to claim 3, wherein the store further includes an OMAD table including the OMAD.

6. The system according to claim 1, wherein the electronic device is configured as a peripheral electronic device for interconnection to a host computer.

7. The system according to claim 1, wherein the file access module is included in the electronic device.

8. The system according to claim 1, wherein the store is configured in accordance with a multi-session CD file system image.

9. The system according to claim 1, wherein the store is configured in accordance with ISO/IEC 13490.

10. The system according to claim 1, wherein the store is configured in accordance with ISO/IEC 13346.

11. The system according to claim 1, wherein the plurality of files are stored in a predetermined session of the multi-session file system image.

12. The system according to claim 1, wherein each session of the multi-session file system image includes one of the file identification data sets.

13. The system according to claim 3, wherein the store is configured in accordance with a multi-session CD file system image and the OMAD is stored in a predetermined session of the multi-session CD file system image.

14. The system according to claim 1, wherein the file access module is configured to operate in accordance with an update session, wherein the update session includes one or more updated files or one or more updated file identification data sets or both.

15. A method for selectively providing operating information for operation of an electronic device in a plurality of operating modes, the method comprising:
   a. providing a plurality of files and a plurality of file identification data sets in a store, each of the file identification data sets associated with one or more of the files, wherein the store is configured as an integral part of the electronic device in accordance with a multi-session file system image, wherein the multi-session file system image is configured to include a predetermined number of sessions, said number of sessions determined based on the number of the plurality of operating modes of the electronic device, and wherein at least one of the plurality of files is associated with two or more of the plurality of file identification sets and said at least one of the plurality of files is stored only once;
   b. operatively interacting with the store to select one of the file identification data sets based on an actual operating mode of the electronic device;
   c. providing the one or more files associated with the file identification data set selected;
wherein each of the file identification data sets indicates the files associated with a corresponding one of the plurality of operating modes, and whereby the files provide the operating information and each file identification data set is associated with one or more of the operating modes.

16. The method according to claim 15, wherein each of the plurality of files is only once included in the plurality of files.

17. The method according to claim 15, further comprising including operating mode association data (OMAD) in the store, the OMAD determining which file identification data set is associated with which operating mode, and further comprising selecting the one of the file identification data sets based on the OMAD and the actual operating mode.

18. The method according to claim 17, wherein the file identification data sets include the OMAD.

19. The method according to claim 17, wherein the store further includes an OMAD table including the OMAD.

20. The method according to claim 15, wherein the electronic device is configured as a peripheral electronic device for interconnection to a host computer.

21. The method according to claim 15, wherein at least step b and step c are performed by the electronic device.

22. A computer-program product configured to selectively provide operating information for operation of an electronic device, the computer program product comprising a non-transitory computer readable medium comprising code, which when loaded into memory and executed on an associated processor, is adapted to perform:
   a. providing a plurality of files and a plurality of file identification data sets in a store, each of the file identification data sets associated with one or more of the files, wherein the store is configured as an integral part of the electronic device in accordance with a multi-session file system image, wherein the multi-session file system image is configured to include a redetermined number of sessions, said number of sessions determined based on the number of the plurality of operating modes of the electronic device, and wherein at least one of the plurality of files is associated with two or more of the plurality of file identification sets and said at least one of the plurality of files is stored only once;

b. operatively interacting with the store to select one of the file identification data sets based on an actual operating mode of the electronic device;

c. providing the one or more files associated with the one of the file identification data sets;

wherein each of the file identification data sets indicates the files associated with a corresponding one of the plurality of operating modes, and whereby the files provide the operating information and each file identification data set is associated with one of the operating modes.

23. The computer-program product according to claim 22, wherein each of the plurality of files is only once included in the plurality of files.

24. The computer-program product according to claim 22, further comprising including operating mode association data (OMAD) in the store, the OMAD determining which file identification data set is associated with which operating mode, and further comprising selecting the one of the file identification data sets based on the OMAD and the actual operating mode.

25. The computer-program product according to claim 22, wherein the electronic device is configured as a peripheral electronic device for interconnection to a host computer.

26. The system according to claim 1, wherein a first one of the plurality of operating modes corresponds to a first function of the electronic device and a second one of the plurality of operating modes corresponds to a second function of the electronic device.

27. The system according to claim 1, wherein the file access module is configured to expose only a selected session of the multi-session file system image at a time, said session selected based on an association with the actual operating mode at said time, said session providing access to the files associated with the selected one of the file identification sets.

* * * * *